United States Patent [19]

Thomas et al.

[11] Patent Number: 5,036,919

[45] Date of Patent: Aug. 6, 1991

[54] FRACTURING WITH MULTIPLE FLUIDS TO IMPROVE FRACTURE CONDUCTIVITY

[75] Inventors: Ronnie L. Thomas; Curtis L. Boney, both of Houston, Tex.

[73] Assignee: Dowell Schlumberger Incorporated, Tulsa, Okla.

[21] Appl. No.: 474,913

[22] Filed: Feb. 5, 1990

[51] Int. Cl.$^5$ ............................................. E21B 43/26
[52] U.S. Cl. .................... 166/271; 166/274; 166/308; 166/309
[58] Field of Search ............... 166/283, 308, 271, 273, 166/274, 309, 305.1

[56] References Cited

U.S. PATENT DOCUMENTS

| | | | |
|---|---|---|---|
| 4,078,609 | 3/1978 | Pavlich | 166/280 |
| 4,534,870 | 8/1985 | Williams | 166/283 |
| 4,657,080 | 4/1987 | Hodge | 166/308 |
| 4,657,081 | 4/1987 | Hodge | 166/308 |
| 4,665,982 | 5/1987 | Brown | 166/308 |
| 4,686,052 | 8/1987 | Baranet et al. | 252/315.3 |
| 4,749,040 | 6/1988 | Hodge | 166/308 |
| 4,749,041 | 6/1988 | Hodge | 166/308 |
| 4,770,796 | 9/1988 | Jacobs | 166/307 |
| 4,797,216 | 1/1989 | Hodge | 166/308 |
| 4,861,500 | 8/1989 | Hodge | 166/308 |

Primary Examiner—Ramon S. Britts
Assistant Examiner—Roger J. Schoeppel
Attorney, Agent, or Firm—Stephen A. Littlefield

[57] ABSTRACT

Conductivity damage is decreased in fracturing a high temperature (greater than 200° F.) well by employing a first fracturing fluid which is substantially stable at the bottom hole static temperature and pumping a second fracturing fluid behind the first fracturing fluid which is less stable at bottom hole static temperature than the first-pumped fracturing fluid.

13 Claims, No Drawings

FRACTURING WITH MULTIPLE FLUIDS TO IMPROVE FRACTURE CONDUCTIVITY

This invention relates to the art of producing hydrocarbons from a subterranean formation and, more particularly, to a process for fracturing a subterranean, hydrocarbon-bearing formation which results in higher fracture conductivity than available previously.

BACKGROUND OF THE INVENTION

In the fracturing of subterranean formations for the production of hydrocarbons, it is common in the art to develop fractures in the zone of interest by pumping a fluid at relatively high pressures which overcome the pressures of the over-burden on the rock in the zone of interest to create and extend fractures in the rock. Such fractures become channels for return of the desired hydrocarbon fluids to the wellbore. Nearly any fluid, given enough pressure, can be used for the fracturing process. However, fracturing fluids generally have a second function, namely that of transporting a particulate proppant material into the fractures so that, upon release of the fluid pressure, the proppant remains within the fractures to hold them open. The rheology of the fluid also acts to influence the extent of the fractures away from the wellbore.

In order to affect the rheology and increase the proppant carrying ability of a fracturing fluid, organic polysaccharide materials such as cellulosics and/or natural and synthetic gums are added to the fluid to increase its viscosity and proppant transport capability. Additionally, particularly with the use of gums and modified gums such as guar, hydroxypropyl guar and the like, the viscosity and proppant transport capability can be even further increased by the use of crosslinking additives. Some well-known crosslink additives include borates as described in U.S. Pat. No. 3,974,077 and titanate or zirconate organometallic crosslinking agents such as described in U.S. Pat. Nos. 4,757,080 and 4,686,052, respectively.

Each of these crosslinked fracturing fluids has its own particular advantages. Borate crosslink systems have the advantage of being less damaging to fracture conductivity because the gels can be broken more efficiently and removed from the fractures leaving fracture passages free for the production of hydrocarbon fluids. Because of thermal breakdown, however, borate crosslinked fracturing fluids can only be used in relatively low temperature (50-225° F.) formations. Titanium and Zirconium organometallic crosslinked fracturing fluids have the advantage of being relatively resistant to thermal breakdown in high temperature (greater than 200° F.) formation environments. However, it is well-known that such high temperature stable, organometallic crosslinked fracturing fluids are somewhat more damaging to proppant conductivity within the resultant fracture. Incomplete breaking of the crosslinked gel can result in relatively large amounts of gel residues remaining in the fracture passages thereby lowering fracture conductivity.

SUMMARY OF THE INVENTION

The present invention provides a method whereby relatively high temperature (above 200° F.) subterranean formation may be fractured by a fracturing fluid system which results in significantly reduced proppant conductivity damage than high-temperature crosslinked fracturing fluid systems.

In accordance with the invention, a fracturing process for a subterranean well comprises determining a bottom hole static temperature for the well, initiating the fracturing procedure by pumping first fracturing fluid pad followed by the step of extending the fractures and transporting proppant to the fractures using a second fracturing fluid which differs from the first fluid and wherein the first fracturing fluid is substantially stable at the determined bottom hole static temperature and the second fracturing fluid is stable at a lower temperature.

Further in accordance with the invention, the above process further includes the step of pumping initial proppant following a pad using a carrier fluid comprising the first high-temperature stable organometallic crosslinked fracturing fluid.

Still further in accordance with the invention, the step of providing a pad comprises providing a pad of low pH, high-temperature stable organometallic crosslinked fracturing fluid which may contain initial quantities of proppant.

It is therefore an object of this invention to provide a process wherein a high-temperature well can be fractured by a fluid system which results in significantly lower fracture conductivity damage once the well is returned to production.

It is yet another object of this invention to provide a fracturing fluid system wherein initial fracturing fluids, upon flow-back serve as an aid to the breaking of the gel of later-pumped fracturing fluids.

DETAILED DESCRIPTION OF THE PREFERRED EMBODIMENTS

As used in this specification and claims, a fracturing fluid is considered "stable" if the fluid can maintain a viscosity of at least 50 cps at 40 sec$^{-1}$ under bottom hole static temperature (BHST) conditions. A fluid having this temperature stability characteristic has sufficient fluid rheology to effect the fracturing and extension of fractures in a subterranean formation as well as sufficient transport capability to carry proppant particles into the formed fractures.

The initial step in accordance with the present invention is to determine the BHST of the formation of interest. This is a well-known determination which can be made emperically by comparison with the known temperature of adjacent wells, known calculation procedures or by direct measurement.

Once the BHST has been determined, a first fracturing fluid is selected which will be substantially stable in accordance with the above definition at the BHST. A pad of this fluid is then pumped into the wellbore at high pressure in order to initiate the fracture of the formation of interest. Polymer loadings may range from about 20 to about 80 lbs per 1000 gallons of fluid. This first fluid may also be used to transport initial proppant into the fractures. Polymer loadings may also be varied during the pad and initial proppant stages of the fracturing operation with this first fluid.

In accordance with the present invention, a second, less damaging, lower temperature stable fracturing fluid which is different from the first fluid is then pumped behind the first fracturing fluid, the second fracturing fluid having rheology and viscosity characteristics sufficient to extend the fracture away from the wellbore and to transport particulate proppant material into the opened fractures. Upon release of fracturing pressures, the fracturing fluid gels break and are returned under formation pressure to the wellbore. However, because the second fracturing fluid is less stable at the BHST than the first fracturing fluid, the second fracturing fluid has a greatly increased breaking efficiency and, as a result, is much more efficiently removed from the formation resulting in less polymer residue remaining within the fracture to cause damage to proppant conductivity than if the entire fracturing fluid process had been performed using only the first fracturing fluid.

In accordance with the present invention, the first fracturing fluid selected for use in a well having a high (greater than 200° F.) BHST is selected from a group of relatively high temperature stable fracturing fluids which generally comprise guar-based polymers such as guar and hydroxypropyl guar or cellulosics such as carboxymethylhydroxyethyl cellulose which are crosslinked with a variety of organometallic crosslinkers such as titanates, zirconates or aluminates. Any of these first fluid compositions may be energized or foamed utilizing a gas such as carbon dioxide or nitrogen and, in the preferred embodiments, such first fluid has a pH which is acidic (less than 7).

The second fluid which is pumped, in accordance with the invention, behind the selected first fluid does not require the high temperature stability of the first pumped fluid. Thus, in the preferred embodiments, the second fluid preferably comprises a gum or cellulosic thickened fluid which may include a crosslinker such as a borate. Additionally, a second fluid could possibly comprise one of the titanate or zirconate crosslinked systems of the first fluid selection, particularly those using a gas energizer or foamer.

In one preferred embodiment of the present invention, the second fluid is preferably a borate crosslinked guar or hydroxypropyl guar fracturing fluid which requires a high pH in order to effect the pH-reversible borate crosslinking mechanism. In this preferred embodiment, the first fluid is preferably a fluid having a low pH such as a guar or hydroxypropyl guar fluid thickener which is crosslinked with a zirconate or titanate organometallic crosslinker having a pH of less than about 7. Upon flow-back, the BHST acts to break down the relatively low temperature stable borate crosslinked second fluid and, additionally, the flow-back of the low pH first fluid through the borate crosslinked second fluid acts to reverse the crosslinking reaction of the borate to further degrade the second fluid system resulting in even lower conductivity damage to the resulting fractures.

EXAMPLE

The bottom hole static temperature for a South Texas gas well was determined to be about 275° F. based on information about adjacent wells drilled into the same formation of interest. Fracturing was initiating using a zirconate crosslinked guar first fracturing fluid having a 60 lb per 1000 gallons polymer loading pumped as a pad to initiate the fracture. The approximately 1000 barrels of this high-temperature stable first fracturing fluid was pumped for a period of about two hours into the zone of interest at a pressure of about 5000 psi. This first fracturing fluid having a 40 lb per 1000 gallon polymer loading was then used to pump initial quantities of proppant into the fractures carrying 5.3 to 7.5 pounds of proppant per gallon of the first fracturing fluid. The second fracturing fluid comprising a borate crosslinked guar solution having a pH of about 10 was then pumped behind the first high-temperature stable fracturing fluid, the second borate crosslinked fluid carrying proppant into the fractures, the proppant loading being gradually increased in the second fracturing fluid from about 7.5 lbs ppg of fracturing fluid up to about 12 lbs ppg. This process was continued for approximately two hours pumping a total of about 1000 barrels of proppant-laden second fracturing fluid into the formation. Upon putting the well on production, a significant increase in gas production was noted over adjacent wells which were fractured utilizing only a single, high-temperature stable fracturing fluid such as used only in the first stage of the instant example.

While the invention has been described in the more limited aspects of a preferred embodiment thereof, other embodiments have been suggested and still others will occur to those upon a reading and understanding of the foregoing specification. It is intended that all such embodiments be included within the scope of this invention as limited only by the appended claims.

Having thus described my invention, we claim:

1. In a process for fracturing a subterranean formation having a bottom hole static temperature above about 200° F., a method of reducing post-fracture conductivity damage in the fracture from a polymer-thickened fracturing fluid comprising the steps of:
   (a) determining bottom hole static temperature of the formation;
   (b) pumping a first fracturing fluid in the formation at fracturing pressure wherein said first fracturing fluid is substantially temperature stable at the bottom hole static temperature; and
   (c) pumping a second fracturing fluid into the formation at fracturing pressure wherein said second fracturing fluid has a temperature stability lower than the temperature stability of the first fracturing fluid at bottom hole static temperature.

2. The method as set forth in claim 1 wherein the step of pumping a first fracturing fluid comprises pumping a first fluid selected from a group consisting of organometallic crosslinked aqueous solutions of
   (i) guar,
   (ii) hydroxypropyl guar,
   (iii) carboxymethylhydroxypropyl guar or
   (iv) carboxymethylhydroxyethyl cellulose and said step of pumping a second fracturing fluid comprises pumping a second fluid which differs from said first fluid and is selected from a group consisting of aqueous solutions of
      (i) guar,
      (ii) carboxymethylhydroxypropyl guar and hydroxypropyl guar based fluids, hydroxyethyl cellulose and carboxymethyl hydroxyethyl cellulose and xanthan fluids,
      (iii) borate crosslinked guar, hydroxypropyl and carboxymethyl hydroxypropyl guar fluids, or
      (iv) organometallic crosslinked guar, hydroxypropyl guar, carboxymethylhydroxypropyl guar and carboxymethylhydroxyethyl cellulose fluids.

3. The process as set forth in claim 2 wherein said first fluid has a pH lower than a pH of said second fluid.

4. The process as set forth in claim 2 wherein said first fluid comprises an organometallic crosslinked guar solution and said second fluid comprises a borate crosslinked guar solution.

5. The process as set forth in claim 4 wherein said first fluid comprises a zirconate crosslinked guar solution.

6. The process as set forth in claim 4 wherein said first fluid comprises a titanate crosslinked guar solution.

7. The process as set forth in claim 2 wherein said first fluid comprises an organometallic crosslinked hydroxypropyl guar solution and said second fluid comprises a borate crosslinked hydroxypropyl guar solution.

8. The process as set forth in claim 2 wherein said first fluid comprises an organometallic crosslinked guar solution and said second fluid comprises a borate crosslinked hydroxypropyl guar solution.

9. The process as set forth in claim 2 wherein said first fluid comprises an organometallic crosslinked guar solution and said second fluid comprises a hydroxyethyl cellulose fracturing fluid.

10. The process as set forth in claim 1 wherein at least one of said first and second fluids is energized with a gas.

11. The process as set forth in claim 10 wherein at least said first fluid is energized with carbon dioxide.

12. The process as set forth in claim 10 wherein at least said first fluid is energized with nitrogen.

13. The process as set forth in claim 1 wherein at least one of said first and second fluids is foamed with a gas.

* * * * *